Oct. 28, 1930.    P. F. YUNGLING    1,779,792
GUIDE FOR FISHES
Filed Sept. 7, 1927
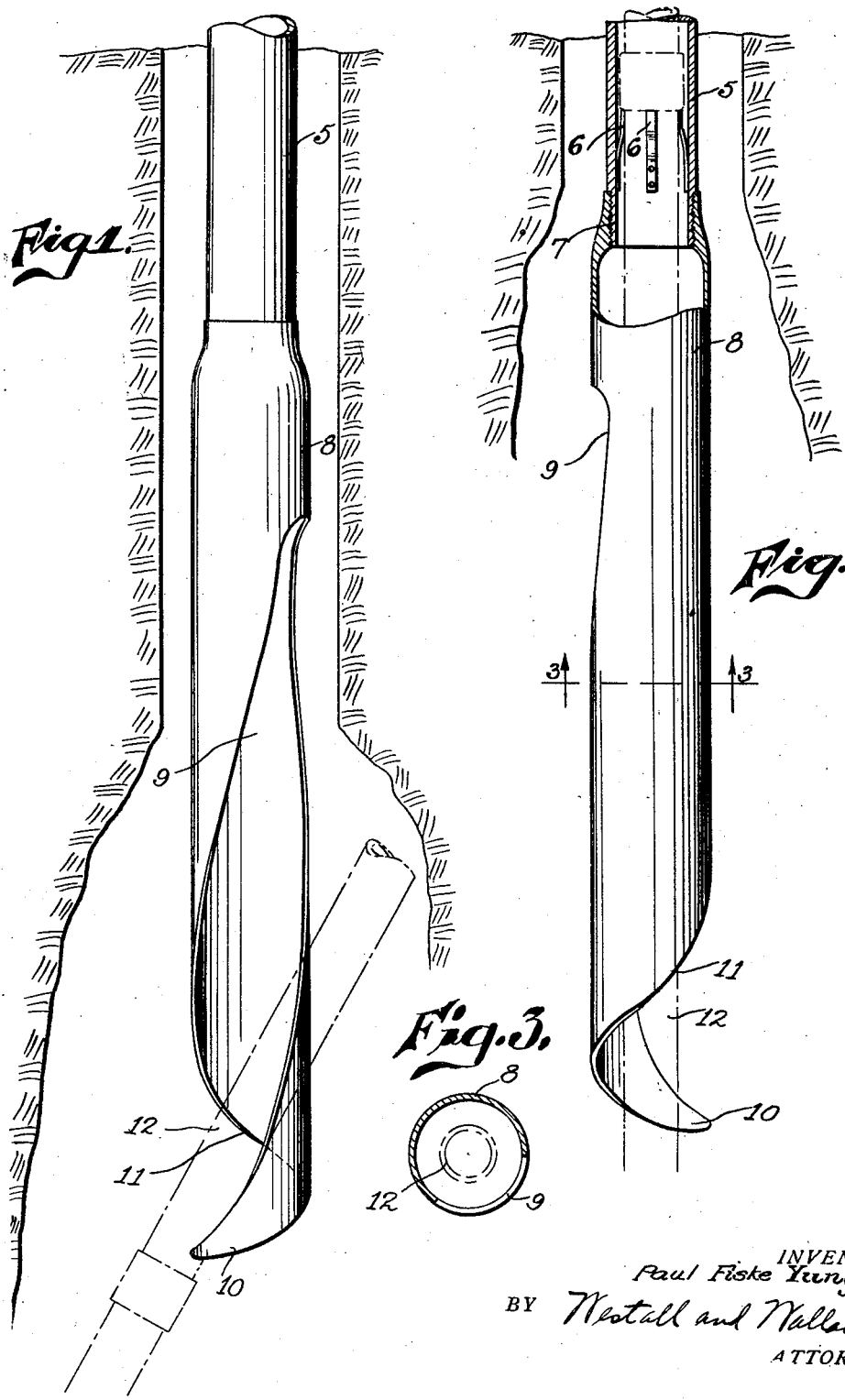
INVENTOR
Paul Fiske Yungling
BY Westall and Wallace
ATTORNEYS Patented Oct. 28, 1930

1,779,792

UNITED STATES PATENT OFFICE

PAUL FISKE YUNGLING, OF LOS ANGELES, CALIFORNIA

GUIDE FOR FISHES

Application filed September 7, 1927. Serial No. 217,945.

This invention relates to an appliance for piloting lost tools and parts in well holes and like places. Lost well drilling tools, equipment and parts commonly termed "fish" require removal from the well hole. Various tools have been devised to obtain a hold on the fish. In many instances, the fish is of some length and arranges itself in cavities crosswise or at an angle to the length of the hole. In order to obtain a hold thereon preparatory to removal it is necessary to straighten the fish or to move it to upright position.

The primary object of this invention is the provision of a tool serving as a pilot and guide for a fishing tool whereby to first straighten the fish and maintain it in this position while the fishing tool is engaged therewith. In addition to the broader object of this invention there are certain details of structure, whereby a durable, strong, simple and easily operated structure is obtained.

These objects together with other objects and corresponding accomplishments are obtained by means of the embodiment of my invention illustrated in the accompanying drawing, in which:

Fig. 1 is an elevation of the pilot attached to an overshot disposed in a well hole shown in section, there being a cavity and a length of pipe indicated in dash and dot lines, the pipe constituting the fish; Fig. 2 is an elevation with the fishing tool shown in section and the fish in upright position; and Fig. 3 is a section as seen on the line 3—3 of Fig. 2.

Referring with more particularity to the drawing, the overshot is shown comprising a bowl 5, within which are spring fingers 6. These fingers are adapted to engage a shoulder on a fish such as the under ledge of the coupling. This is a common construction, the particular fishing tool being shown for illustrative purposes only. Other tools may be employed for obtaining a hold upon the fish or performing some work upon the latter so that a hold may be obtained. The lower end of the bowl is externally threaded as indicated by 7.

The pilot comprises a shell 7 which is belled inwardly at the upper end and internally threaded so that it may be attached to the bowl. This pilot is in general of tubular form having a relatively long slot 9 extending axially and preferably pitched. The lower end of the shell is pointed and of cork screw hook form. The toe 10 of the hook in its angular position is such that it overhangs peripherally the lower portion of the slot 9. The slot is substantially of uniform width to a point adjacent its lower end being there widened and the heel edge 11 of the slot sloped downward to the point of the toe so as to form an inclined surface or ramp.

Assume that the fish is a section of drill pipe 12, which has lodged in a cavity in the well hole which may have been formed by caving in of a wall. If it is desired to remove the same by use of an overshot, obviously it would be difficult and probably impossible in the position shown in Fig. 1 for the overshot tool to take hold of the fish without the aid of other tools for straightening the latter. In such cases, it has been the practice to use a wall hook of corkscrew form. The hook is lowered and rotated so as to engage the fish, then it is pulled upwardly to straighten the fish and thereafter removed from the hole for operation of the overshot. It is apparent that in many instances, the fish upon removal of the hook will fall back to its original position.

The present appliance is intended to overcome this difficulty. The pilot guide is attached to the fishing tool and lowered in the hole until the fish is engaged. The heel 11 of the guide resting on the fish with the weight of the string upon it, tends to cause the tool to rotate. This is because of the pitch to the heel edge. If the tool does not rotate of itself, it may be aided by rotating the string. The toe 10 works itself about the fish so as to embrace the latter. The fish rides against the edge of the slot in the pilot, until it is straightened and entirely embraced by the wall of the pilot. The string is then lowered as indicated in Fig. 2 so that the overshot may obtain a grip upon the fish. Thereupon, the fish is raised. The pitch angle of the slot is relatively small, so that the fish is compelled to straighten and move upwardly within the shell of the pilot without opportunity of passing outwardly.

What I claim is:

1. A device of the class described comprising a tubular shell, said shell having a slot formed throughout the major portion thereof, said slot being formed at a slight angle relative to the axis of the shell, and a helical toe disposed across the mouth of said slot.

2. A device of the class described comprising a tubular shell, said shell having a slot formed throughout the major portion thereof, said slot being formed at a slight angle relative to the axis of the shell, the edges of said slot converging at the lower extremity of the shell whereby the latter will terminate in a helical toe across the lower mouth of the slot.

In witness that I claim the foregoing I have hereunto subscribed my name this 19th day of August, 1927.

PAUL FISKE YUNGLING.